(12) United States Patent
Winograd et al.

(10) Patent No.: US 10,827,310 B2
(45) Date of Patent: Nov. 3, 2020

(54) REAL-TIME ASSET LOCATION TRACKING AND MONITORING AT A LOW DATA RATE

(71) Applicant: Phillips Connect Technologies, Inc., Santa Fe Springs, CA (US)

(72) Inventors: Gil Winograd, Aliso Viejo, CA (US); William E. Cheney, La Jolla, CA (US)

(73) Assignee: Phillips Connect Technologies, Inc., Santa Fe Springs, CA (US)

( * ) Notice: Subject to any disclaimer, the term of this patent is extended or adjusted under 35 U.S.C. 154(b) by 0 days.

(21) Appl. No.: 16/572,658

(22) Filed: Sep. 17, 2019

(65) Prior Publication Data

US 2020/0092682 A1 Mar. 19, 2020

Related U.S. Application Data

(60) Provisional application No. 62/732,004, filed on Sep. 17, 2018.

(51) Int. Cl.
*H04W 4/029* (2018.01)
*G01S 19/34* (2010.01)
*H04W 88/02* (2009.01)

(52) U.S. Cl.
CPC ........... *H04W 4/029* (2018.02); *G01S 19/34* (2013.01); *H04W 88/02* (2013.01)

(58) Field of Classification Search
CPC ........ H04W 4/029; H04W 88/02; G01S 19/34
See application file for complete search history.

(56) References Cited

U.S. PATENT DOCUMENTS

| 6,983,205 | B2 | 1/2006 | Chen et al. | |
|---|---|---|---|---|
| 10,506,057 | B2* | 12/2019 | Ornelas | H04L 67/42 |
| 2009/0167599 | A1 | 7/2009 | Johnson et al. | |
| 2012/0058782 | A1* | 3/2012 | Li | G01S 19/14 |
| | | | | 455/456.2 |
| 2013/0036238 | A1 | 2/2013 | Chowdhary et al. | |
| 2013/0143589 | A1* | 6/2013 | Huang | H04W 52/0254 |
| | | | | 455/456.1 |
| 2013/0238573 | A1 | 9/2013 | Pifre | |
| 2015/0293232 | A1 | 10/2015 | Crawford et al. | |
| 2018/0342142 | A1* | 11/2018 | Lau | G08B 21/0288 |

* cited by examiner

*Primary Examiner* — Marisol Figueroa
(74) *Attorney, Agent, or Firm* — Luedeka Neely Group, P.C.

(57) ABSTRACT

A method is described for operating an asset tracking device, wherein the tracking device normally collects many location points at a high periodic rate and transmits the location points as a single compressed location history data block at a low periodic rate, which greatly reduces the amount of transmitted data required to send a detailed location history. When a user begins actively viewing the asset location in some application such as on a mobile device, a command is immediately sent from the tracking server back to the tracking device. This command causes the device to start transmitting location reports at a high periodic rate, thereby allowing the user to monitor the current location of the asset in real-time. Transmission at the high data rate required for real-time monitoring only occurs while the user is actively interacting with the application, which is usually a short period of time.

12 Claims, 2 Drawing Sheets

REAL-TIME ASSET LOCATION TRACKING AND MONITORING AT A LOW DATA RATE

RELATED APPLICATIONS

This application claims priority to provisional patent application Ser. No. 62/732,004, titled Real-Time Asset Location Tracking And Monitoring At A Low Data Rate, filed Sep. 17, 2018.

FIELD

This invention relates to the field of asset tracking. More particularly, this invention relates to a system for providing real-time asset location tracking and monitoring information from an asset tracking device at a low data rate.

BACKGROUND

Asset tracking devices that implement GPS and wireless data transmission technologies are increasingly used for tracking the locations of valuable mobile assets, such as automobiles, construction equipment, and cargo containers. It is often desirable for an asset tracking device to report the location of a mobile asset at a high periodic rate (e.g. 1-10 second intervals). This provides a highly detailed recorded history of the movement of the asset and the ability to monitor the current location of the asset in real-time. A straightforward implementation in which the asset transmits location reports at a high periodic rate results in a very high rate of data transmission. Even short data transmissions at a high data rate are usually very expensive in terms of overhead data and power. Cellular data carriers charge customers for their data usage, making it particularly desirable to reduce data transmissions for cellular-based asset tracking devices.

What is needed, therefore, is an asset tracking device that implements different data transmission rates depending on its operational mode.

SUMMARY

The above and other needs are met by a method for operating an asset tracking device, wherein the tracking device normally collects many location points at a high periodic rate and transmits the collection of location points as a single compressed location history data block at a low periodic rate. This greatly reduces the amount of transmitted data—both overhead and payload—required to send a detailed location history. Further, as soon as a user begins actively viewing the asset location in some application (such as on a mobile device application or web browser), a command is immediately sent from the cloud service (that is subscribed to the asset tracker data stream) back to the tracking device. This command causes the device to start transmitting location reports at a high periodic rate, thereby allowing the user to monitor the current location of the asset in real-time. Transmission at the high data rate required for real-time monitoring only occurs while the user is actively interacting with the application, which is usually a short period of time. When the user ceases interacting with the application, the cloud service sends another command to the device to cause the device to return to the low-data-rate compressed-location-history transmission mode. A user that opens the application observes both the detailed past location history and the current real-time location monitoring. Thus, to the user it appears that the tracking device has always been transmitting the location data continuously at a high data rate.

One preferred embodiment described herein is directed to an asset tracking device that determines and reports locations of a mobile asset. The asset tracking device includes a GPS receiver, a memory device, a wireless data transceiver, and a processor. The GPS receiver generates location data indicating the locations of the mobile asset, and the memory device stores the location data. The wireless data transceiver transmits the location data and receives a first command and a second command via the wireless communication network. The processor executes instructions in a first operational mode to compress the location data for storage in the memory device, and to cause the wireless data transceiver to transmit the location data via the wireless communication network at a first data transmission rate. The processor executes instructions in a second operational mode to cause the wireless data transceiver to transmit the location data at a second data rate that is higher than the first data rate. The processor ceases operation in the first operational mode and commences operation in the second operational mode upon receipt of the first command, and ceases operation in the second operational mode and commences operation in the first operational mode upon receipt of the second command.

In some embodiments, the memory device stores the location data as compressed location data or uncompressed location data, depending on the operational mode.

In some embodiments, the wireless data transceiver transmits the location data in a compressed format when in the first operational mode.

In some embodiments, the wireless data transceiver transmits the location data in one or more compressed location history data blocks when in the first operational mode.

In some embodiments, the wireless data transceiver transmits the location data in an uncompressed format when in the second operational mode.

In another aspect, some embodiments provide a method for tracking a mobile asset that includes the following steps:
 (a) an asset tracking device operating in a first operational mode wherein the asset tracking device transmits one or more first location history data blocks at a first data transmission rate via a wireless communication network, the one or more first location history data blocks indicating a first set of locations of the mobile asset during a first period of time;
 (b) a tracking server receiving and storing the one or more first location history data blocks transmitted from the asset tracking device via the wireless communication network;
 (c) a user device communicating with the tracking server via the wireless communication network to request viewing of locations of the mobile asset;
 (d) based on receiving the request from the user device, the tracking server sending a first command to the asset tracking device via the wireless communication network;
 (e) the asset tracking device receiving the first command and based thereon ceasing operations in the first operational mode and commencing operations in a second operational mode;
 (f) the asset tracking device operating in the second operational mode wherein the asset tracking device transmits location data via the wireless communication network at a second data transmission rate that is greater than the first data transmission rate, the location data indicating a second set of locations of the mobile asset during a second period of time that is subsequent to the first period of time;

(g) the tracking server receiving the location data transmitted from the asset tracking device via the wireless communication network, and communicating the location data to the user device via the wireless communication network; and (h) the user device displaying the first set of locations and the second set of locations for viewing by a user.

In some embodiments, the method includes continuing to perform steps (f), (g), and (h) at least until expiration of a timeout period that commenced upon the asset tracking device receiving the first command.

In some embodiments, the timeout period is based on a time value embedded in the first command.

In some embodiments, the timeout period is based on a time value that is preprogrammed into the asset tracking device.

In some embodiments, the method also includes:

(i) the user device disengaging from communication with the tracking server;

(j) based on disengagement of communication with the user device, the tracking server sending a second command to the asset tracking device via the wireless communication network;

(k) the asset tracking device receiving the second command and based thereon ceasing operations in the second operational mode and commencing operations in the first operational mode;

(l) the asset tracking device operating in the first operational mode wherein the asset tracking device transmits one or more second location history data blocks at the first data transmission rate via the wireless communication network, the one or more second location history data blocks indicating a third set of locations of the mobile asset during a third period of time that is subsequent to the second period of time; and (m) the tracking server receiving and storing the one or more second location history data blocks transmitted from the asset tracking device via the wireless communication network.

In some embodiments, step (c) includes the user device executing an asset tracking application that communicates with the tracking server.

In some embodiments, the second data transmission rate is sufficient to enable real-time viewing of the second set of locations on the user device.

In some embodiments, the first location history data blocks are in a compressed format.

BRIEF DESCRIPTION OF THE DRAWINGS

Other embodiments of the invention will become apparent by reference to the detailed description in conjunction with the figures, wherein elements are not to scale so as to more clearly show the details, wherein like reference numbers indicate like elements throughout the several views, and wherein.

DETAILED DESCRIPTION

Figure 1:
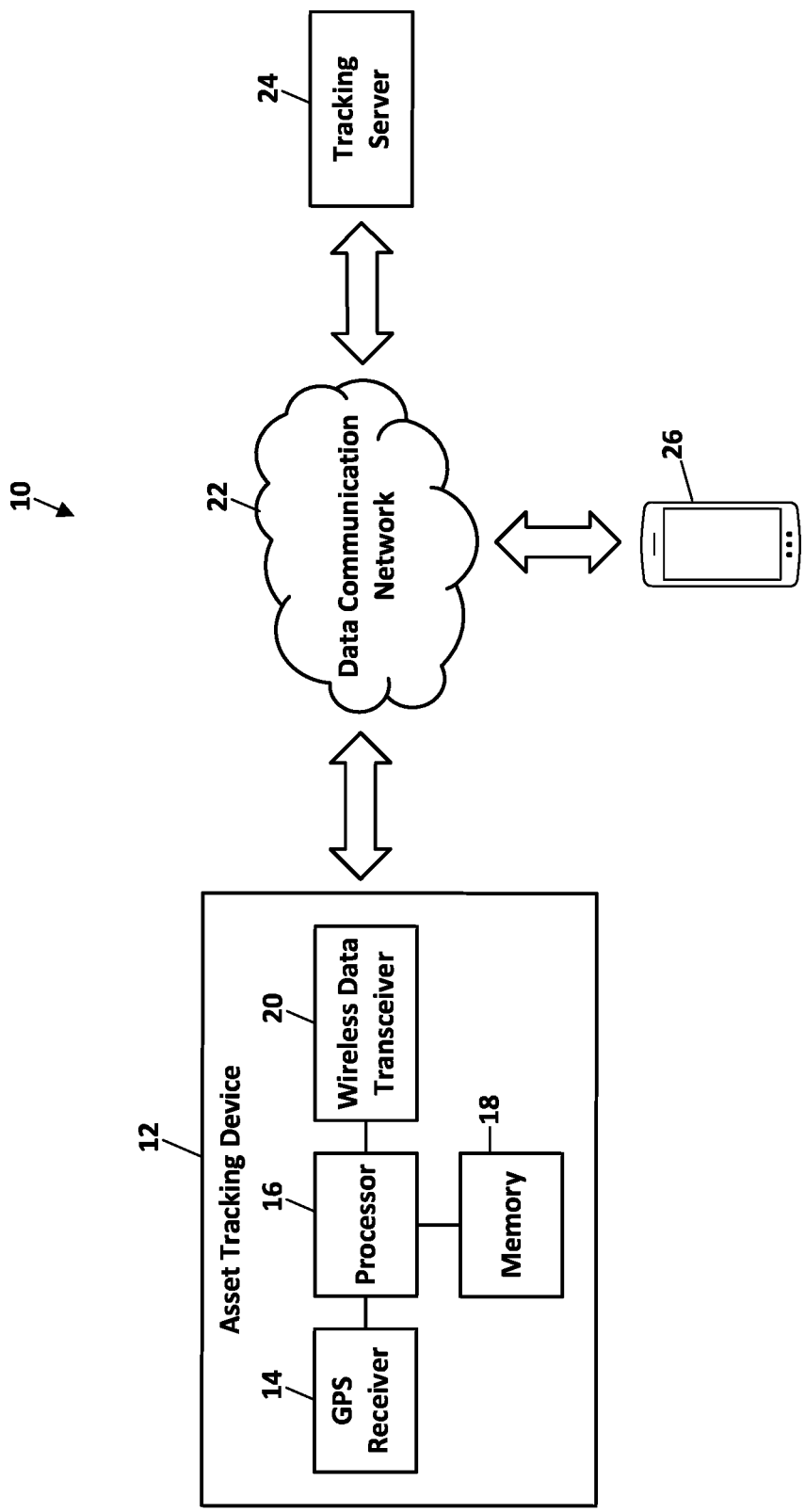
FIG. 1 depicts an asset tracking system according to an embodiment of the invention.

As shown in FIG. 1, a preferred embodiment of an asset tracking system 10 includes an asset tracking device 12 that is in communication with a tracking server 24 via a data communication network 22. The asset tracking device 12 may be installed in a vehicle, in a cargo container, or in any other valuable mobile asset. The asset tracking device 12 includes a GPS receiver 14, a wireless data transceiver 20, a memory device 18, and a data processor 16. The wireless data transceiver 20 may comprise a cellular data modem. If installed in a vehicle, the asset tracking device 12 is preferably connected to the vehicle's onboard diagnostics (OBD) port through which the device 12 receives power from the vehicle's battery. If installed in a cargo container, the asset tracking device 12 includes an internal battery.

The system 10 also includes a user device 26 that is in communication with the tracking server 24 via the data communication network 22. In various embodiments, the user device 26 comprises a smartphone, a tablet computer, a laptop computer, a desktop computer, or any other personal computing device.

The tracking server 24 includes processors, memory devices, and mass data storage devices for performing data processing and storage tasks as described herein.

The data communication network 22 comprises wireless and wired communication components, and may include cellular data networks, Wi-Fi data networks, and wide area data communication networks, such as the Internet.

Figure 2:
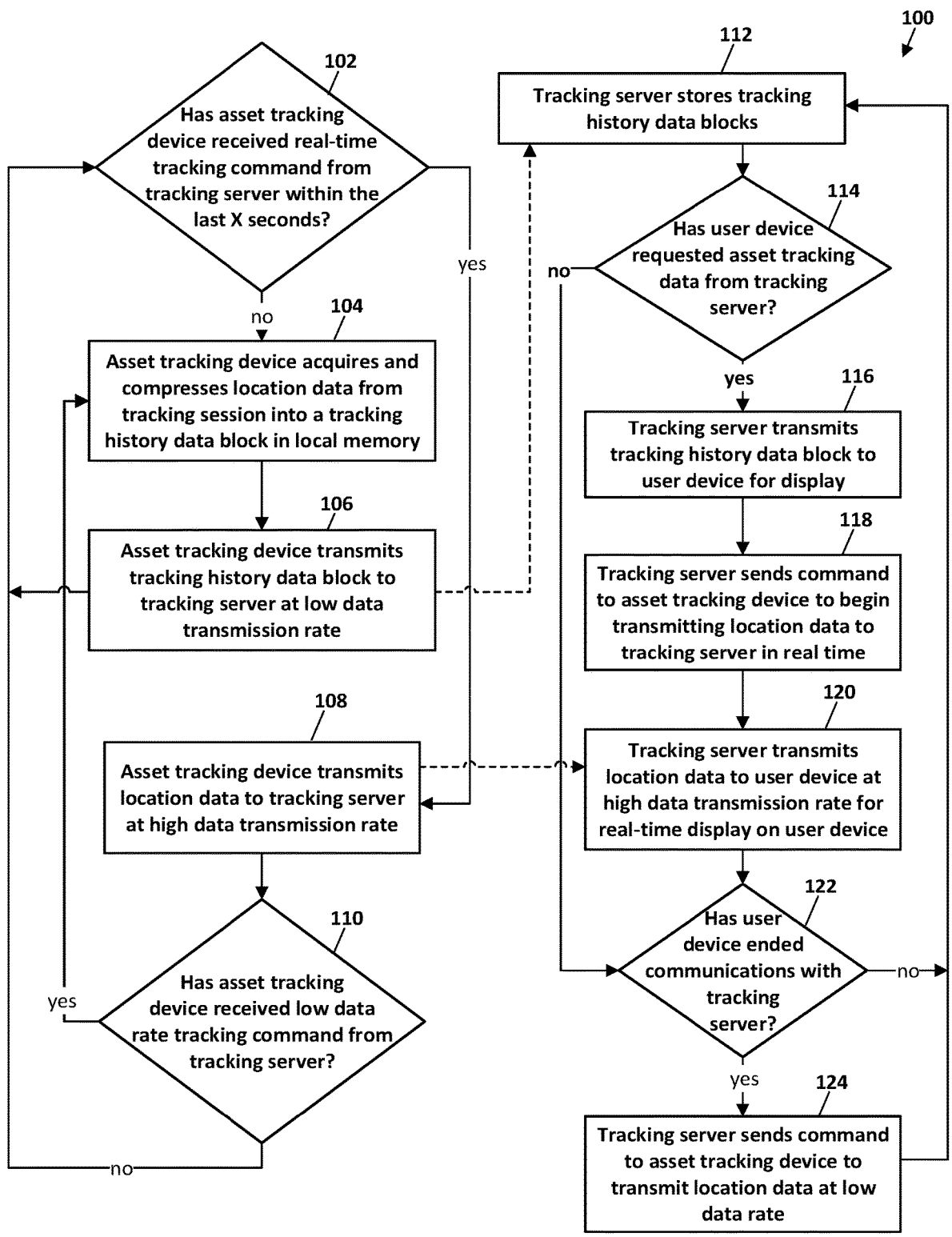
FIG. 2 depicts an asset tracking method according to an embodiment of the invention.

FIG. 2 depicts a preferred embodiment of a method 100 for tracking a mobile asset using the user device 26. It will be appreciated that some steps of the method may be performed by software running on the tracking server 24, some steps may be performed by firmware in the asset tracking device 12, and some steps may be performed by a software application executed by the user device 26. Steps performed by the asset tracking device 12 are shown on the left side of FIG. 2, while steps performed by the tracking server 24 are shown on the right side.

During normal operation, the GPS receiver 14 periodically determines the location of the asset in which it is installed, and the location coordinates generated by the GPS receiver 14 are stored in the memory 18 of the device 12. In a preferred embodiment, the format in which the location data is stored and the frequency at which the location data is reported to the tracking server 24 depends on the most recent command from the tracking server 24. The type of the command—which will be either a real-time tracking command or a low data rate tracking command—depends on whether the user device 26 is interacting with the tracking server 24 to initiate tracking, as discussed hereinafter.

With reference now to FIG. 2, if the asset tracking device 12 has not received a real-time tracking command from the tracking server 24 within some period of time (i.e., x seconds) (step 102), the GPS receiver 14 of the tracking device 12 continues acquiring location coordinate data, and the processor 16 compresses the location data into a tracking history data block for storage in the memory device 18 (step 104). The compressed location data is periodically transmitted from the wireless data transceiver 20 to the tracking server 24 via the data communication network 22 at a low data transmission rate, thereby conserving network data bandwidth (step 106). This process loops back to step 102 and continues indefinitely until the asset tracking device 12 receives a real-time tracking command from the tracking server 24 to begin transmitting at a high data rate.

With continued reference to FIG. 2, once the asset tracking device 12 receives a real-time tracking command from the tracking server 24 (step 102), the GPS receiver 14 of the tracking device 12 continues acquiring location coordinate data, and the wireless data transceiver 20 transmits the location data to the tracking server 24 via the data communication network 22 at a high data transmission rate, thereby providing real-time asset tracking data (step 108). The high data rate tracking continues until the asset tracking device 12 receives a low data rate tracking command from the tracking server 24 (step 110) or the timeout period (x) since receipt of the last real-time tracking command is exceeded (step 102).

With regard to the tracking server side of the process (right side of FIG. 2), if the user device 26 has engaged the tracking server 24 to begin actively tracking the location of the mobile asset (step 114), the tracking server 24 first transmits the tracking history data to the user device 26 for display, which is the data that has been transmitted over time from the asset tracking device 12 at a low data rate (step 116). The tracking server 24 also sends a command to the asset tracking device 12 to cause the device 12 to start sending tracking data in real-time, at a high data rate (step 118). The tracking server 24 then communicates the real-time tracking data from the tracking device 12 to the user device 26 for display in real time.

When the user device 26 disengages from communications with the tracking server 24 to actively track the location of the mobile asset (step 122), the tracking server 24 transmits a command to the asset tracking device 12 to cause the device 12 to again send tracking data at a low data rate (step 124).

It is possible that the tracking server 24 may fail to send the command to the tracking device 12 to cause it to return to low data rate transmission, or a sent command may otherwise fail to reach the device 12. In such a situation, the tracking device 12 could continue to indefinitely transmit location data at a high data rate that could result in high data cost or high energy usage. The timeout period (i.e., x seconds) is provided to prevent this occurrence. Thus, in a preferred embodiment, each real-time tracking command from the tracking server 24 includes an embedded timeout period parameter), such as 300 seconds. In an alternative embodiment, the timeout period has been previously stored in the tracking device 12. If the tracking device 12 does not receive a new real-time tracking command from the tracking server 24 within the timeout period, the device 12 automatically ceases the high data rate transmission mode and returns to the low data rate compressed-history-transmission mode. So long as the user continues interacting with the tracking application on the user device 26, the tracking server 24 periodically re-sends the command to the device 12 within the timeout period to continue providing real-time location reporting (step 118).

Location Data Encoding

A known method for generating compressed periodic location history data fully encodes an initial location point, and encodes the remainder of the location history as a series of displacements from the prior location. Since the location points are provided at a uniform time interval, each displacement is a proxy for velocity. The initial location point, which could be anywhere on the surface of the Earth, must be encoded by a high number of bytes, such as at least six bytes to achieve less than a 2.5 m resolution. Asset velocities are typically less than about 150 km/hr (40 m/s). At these velocities, and at an exemplary update period of no more than eight seconds, x and y displacements may be encoded at a 2.5 m resolution within one byte each (two bytes total). Absent the application of significant braking, acceleration, or steering, the typical velocity of a vehicle—or an asset in a vehicle—is nearly constant.

Thus, preferred embodiments described herein encode a history of periodic locations with data representing a proxy for accelerations, rather than velocity. This history is encoded by fully specifying the initial location point, specifying a second location point as a displacement from the initial location, and specifying all subsequent location points as a change-in-displacement from the previous displacement. Using this encoding, most normal automotive driving behavior results in a change-in-displacement of less than 18 m if the periodic rate is less than eight seconds, and this can be encoded into four bits for each x and y displacement value at 2.5 m resolution. This results in one byte total per each location history point.

While most location history points are encoded into a single byte, extension codes are reserved within the byte to allow for special circumstances. In case of aggressive driving behavior, some location points may fail to encode within the range allowed by a single byte. In that case, a reserved nybble (half byte) value for x or y indicates an extension for encoding the change-in-displacement using similar techniques within the subsequent 12 bits (two bytes total) or even three bytes as necessary. The use of extension codes results in a variable rate encoder that smoothly transitions from one byte per location to two bytes per location on a point-by-point basis. This allows graceful degradation of the encoding rate as the time interval between collected locations points is configured to values larger than five seconds. An additional application of the extension code is to efficiently encode long periods of time during which the asset is stationary, such as at a traffic light, by encoding the number of stationary location points.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. An asset tracking device for determining and reporting locations of a mobile asset, the asset tracking device comprising:
    a global positioning system (GPS) receiver for generating location data indicating the locations of the mobile asset;
    a memory device for storing the location data;
    a wireless data transceiver for transmitting the location data via a wireless communication network, and for receiving a first command and a second command via the wireless communication network; and
    a processor for executing instructions in a first operational mode to compress the location data for storage in the memory device, and to cause the wireless data transceiver to transmit the location data via the wireless communication network at a first data transmission rate;
    the processor for executing instructions in a second operational mode to cause the wireless data transceiver to transmit the location data at a second data rate that is higher than the first data rate;

the processor for ceasing operation in the first operational mode and commencing operation in the second operational mode upon receipt of the first command; and the processor for ceasing operation in the second operational mode and commencing operation in the first operational mode upon receipt of the second command, wherein the memory device stores the location data as compressed location data or uncompressed location data, depending on the operational mode.

2. The asset tracking device of claim 1 wherein the wireless data transceiver transmits the location data in a compressed format when in the first operational mode.

3. The asset tracking device of claim 2 wherein the wireless data transceiver transmits the location data in one or more compressed location history data blocks when in the first operational mode.

4. The asset tracking device of claim 1 wherein the wireless data transceiver transmits the location data in an uncompressed format when in the second operational mode.

5. A method for tracking a mobile asset comprising:
(a) an asset tracking device operating in a first operational mode wherein the asset tracking device transmits one or more first location history data blocks at a first data transmission rate via a wireless communication network, the one or more first location history data blocks indicating a first set of locations of the mobile asset during a first period of time;
(b) a tracking server receiving and storing the one or more first location history data blocks transmitted from the asset tracking device via the wireless communication network;
(c) a user device communicating with the tracking server via the wireless communication network to request viewing of locations of the mobile asset;
(d) based on receiving the request from the user device, the tracking server sending a first command to the asset tracking device via the wireless communication network;
(e) the asset tracking device receiving the first command and based thereon ceasing operations in the first operational mode and commencing operations in a second operational mode;
(f) the asset tracking device operating in the second operational mode wherein the asset tracking device transmits location data via the wireless communication network at a second data transmission rate that is greater than the first data transmission rate, the location data indicating a second set of locations of the mobile asset during a second period of time that is subsequent to the first period of time;
(g) the tracking server receiving the location data transmitted from the asset tracking device via the wireless communication network, and communicating the location data to the user device via the wireless communication network;
(h) the user device displaying the first set of locations and the second set of locations for viewing by a user; and
continuing to perform steps (f), (g), and (h) at least until expiration of a timeout period that commenced upon the asset tracking device receiving the first command.

6. The method of claim 5 wherein the timeout period is based on a time value embedded in the first command.

7. The method of claim 5 wherein the timeout period is based on a time value that is preprogrammed into the asset tracking device.

8. The method of claim 5 further comprising:
(i) the user device disengaging from communication with the tracking server;
(j) based on disengagement of communication with the user device, the tracking server sending a second command to the asset tracking device via the wireless communication network;
(k) the asset tracking device receiving the second command and based thereon ceasing operations in the second operational mode and commencing operations in the first operational mode;
(l) the asset tracking device operating in the first operational mode wherein the asset tracking device transmits one or more second location history data blocks at the first data transmission rate via the wireless communication network, the one or more second location history data blocks indicating a third set of locations of the mobile asset during a third period of time that is subsequent to the second period of time; and
(m) the tracking server receiving and storing the one or more second location history data blocks transmitted from the asset tracking device via the wireless communication network.

9. The method of claim 5 wherein step (c) comprises the user device executing an asset tracking application that communicates with the tracking server.

10. The method of claim 5 wherein the second data transmission rate is sufficient to enable real-time viewing of the second set of locations on the user device.

11. The method of claim 5 wherein the first location history data blocks are in a compressed format.

12. A method for tracking a mobile asset comprising:
(a) an asset tracking device operating in a first operational mode wherein the asset tracking device transmits one or more first location history data blocks at a first data transmission rate via a wireless communication network, the one or more first location history data blocks indicating a first set of locations of the mobile asset during a first period of time;
(b) a tracking server receiving and storing the one or more first location history data blocks transmitted from the asset tracking device via the wireless communication network;
(c) a user device communicating with the tracking server via the wireless communication network to request viewing of locations of the mobile asset;
(d) based on receiving the request from the user device, the tracking server sending a first command to the asset tracking device via the wireless communication network;
(e) the asset tracking device receiving the first command and based thereon ceasing operations in the first operational mode and commencing operations in a second operational mode;
(f) the asset tracking device operating in the second operational mode wherein the asset tracking device transmits location data via the wireless communication network at a second data transmission rate that is greater than the first data transmission rate, the location data indicating a second set of locations of the mobile asset during a second period of time that is subsequent to the first period of time;
(g) the tracking server receiving the location data transmitted from the asset tracking device via the wireless communication network, and communicating the location data to the user device via the wireless communication network;

(h) the user device displaying the first set of locations and the second set of locations for viewing by a user;

(i) the user device disengaging from communication with the tracking server;

(j) based on disengagement of communication with the user device, the tracking server sending a second command to the asset tracking device via the wireless communication network;

(k) the asset tracking device receiving the second command and based thereon ceasing operations in the second operational mode and commencing operations in the first operational mode;

(l) the asset tracking device operating in the first operational mode wherein the asset tracking device transmits one or more second location history data blocks at the first data transmission rate via the wireless communication network, the one or more second location history data blocks indicating a third set of locations of the mobile asset during a third period of time that is subsequent to the second period of time; and (m) the tracking server receiving and storing the one or more second location history data blocks transmitted from the asset tracking device via the wireless communication network.

* * * * *